W. STRAIT.
TRACTION MACHINE.
APPLICATION FILED DEC. 24, 1912.

1,178,552.

Patented Apr. 11, 1916.

Witnesses.
C. K. Davis
W B Brock

Inventor
William Strait
by Burch, Barker, Smith
Attorney

UNITED STATES PATENT OFFICE.

WILLIAM STRAIT, OF APPLETON, WISCONSIN.

TRACTION-MACHINE.

1,178,552.   Specification of Letters Patent.   Patented Apr. 11, 1916.

Application filed December 24, 1912. Serial No. 738,497.

*To all whom it may concern:*

Be it known that I, WILLIAM STRAIT, a citizen of the United States, residing at Appleton, Wisconsin, have invented certain new and useful Improvements in Traction-Machines, of which the following is a specification.

My invention relates to traction mechanism.

One of the objects of my invention is to enable a belt tractor adapted for use in traction machines to properly accommodate itself to different driving and ground conditions.

Another object is to enable the tractor to easily pass over irregularities in its path.

A further object is to secure an ample contact area for all conditions and at the same time a reduced ground contact area for traveling on hard ground.

A further object is to make the tractor equally serviceable for forward or reverse driving, and to enable it at times to automatically change its position in accordance with the driving direction.

A further object is to provide positive means for adjusting the tractor in relation to the machine proper and to make these adjusting means inoperative when desired; in other words, to allow the tractor to act automatically or to positively fix its position.

Other objects will be sufficiently pointed out hereafter.

The invention consists in a combination of elements to bring about the foregoing and other results.

The accompanying drawing illustrates one exemplifying embodiment of the invention, but it is to be understood that the invention can be embodied in many different forms.

Figure 1:
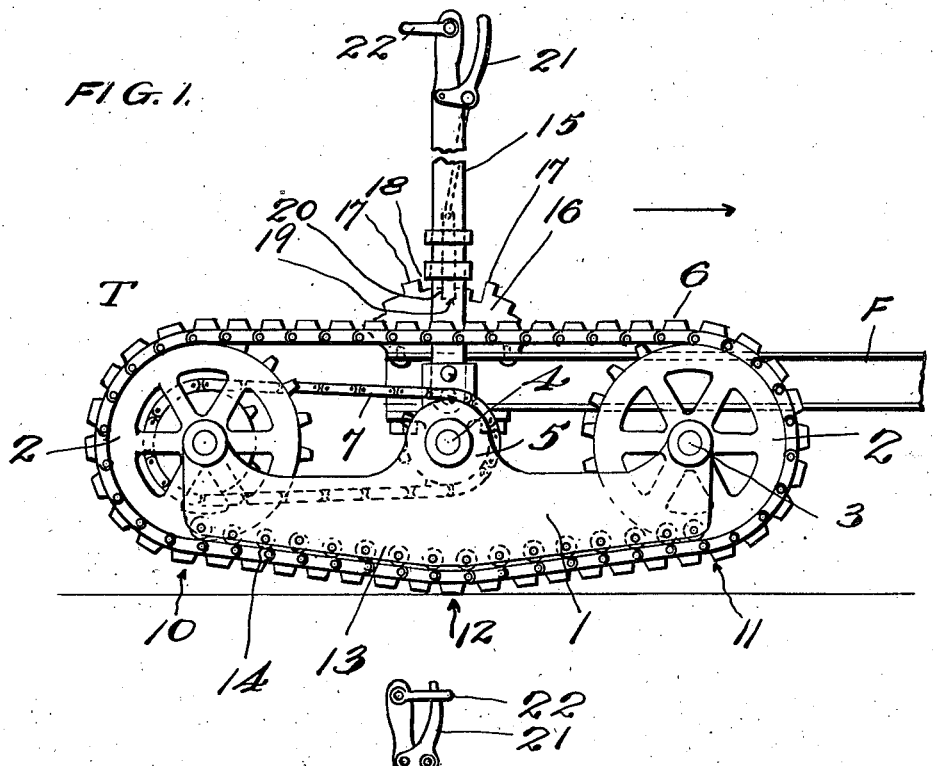
Figure 2:
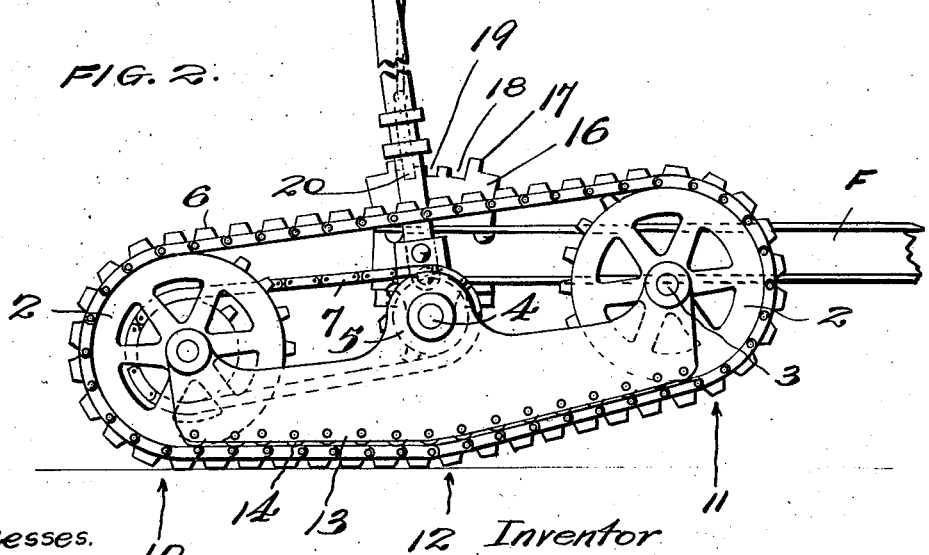

Figure 1 is a side elevation of a tractor embodying the invention, this being shown in operative relation to a fragment of a traction machine. Fig. 2 is a similar view with the tractor in a different operative position.

F designates the main frame of the traction machine, to which the tractor T is connected. The tractor has a tractor frame, consisting in this embodiment principally of the side members 1 carrying at each end a belt sprocket 2. These sprockets are mounted on suitable shafts 3 carried by the side members. The side members are conveniently connected to the main frame F by pivoting them about or upon a driving axle 4 carried by the main frame, and for this purpose the side members are usually provided with upwardly extending lugs or ears 5. The entire tractor, therefore, has a pivotal or swinging connection with the machine proper. The tractor belt 6 passes about and suitably engages the sprockets 2. Either of these sprockets may be the driver and the other an idler, but in the present instance the rear sprocket 2 is shown as the driver, and for that purpose it is provided with suitable chain or gear connections 7 to the driving axle 4, the details of this driving connection not being important except that, as shown, they are adapted to accommodate the swinging movement of the tractor upon or about the axle.

The lower part of side members 1 constitutes a track for the lower reach or ground stretch of the belt. "Ground stretch" designates the part of the belt from 10 to 11, and, as the term indicates, is the part which may be in contact with the ground either at once or under different operative conditions. This ground stretch is formed with a bulge or peak 12 between its two ends and an inclined part between 11 and 12, and a similar inclined part between 10 and 12. This conformation of the ground stretch is produced by a similar shaping of the track 13 constituted by the lower edges of the side members 1 adjacent to the belt. This track is preferably provided with a multiplicity of anti-friction rolls 14, or other devices, to directly engage the belt and eliminate friction as much as possible.

The pivotal connection of the tractor frame with the main frame is shown substantially central between the belt sprockets, but the location of this point may vary considerably, as will appear. The location of the bulge or peak 12 in the ground stretch of the belt is also shown substantially central between the sprockets 12, that is substantially midway between the ends of said ground stretch, but the exact location of this point may also vary considerably, and will usually vary with the change in relative positions of the pivot point 4 and one of the sprockets 2, as will appear.

In some cases the tractor may be free to move on its pivot 4, but in other cases positive means for holding it in various positions are provided as follows: Connected to tractor frame 1 is a lever 15. On the main frame is a sector 16 provided with stops 17, end notches 18 and a center notch 19. The lever is provided with a pawl 20 to engage the notches, a grip piece 21 to release the pawl, and a latch 22 to engage the grip piece when desired to hold the pawl out of engagement with the notches. When the grip piece 21 is free, the pawl will engage either notch and hold the lever and the tractor in fixed position, but when latch 22 engages the grip piece and holds the pawl out of the notches, the tractor is free to move in accordance with operative conditions, as will be explained.

As shown in Fig. 1, grip piece 21 is free and pawl 20 engages the center notch 19, and the tractor is held in central position with the axes of the belt sprockets 2 in a substantially horizontal line. In this position, as shown in Fig. 1, in either direction of running, the ground stretch of the belt has an inclined part running from the end to the bulge or peak at the middle. In forward running, if a large stone, stump, or other obstruction is encountered, it will easily pass under the forward sprocket. The forward incline will then ride up the obstruction gradually until the peak 12 is reached, and then the rear incline will gradually ride down the obstruction. In running on hard ground, usually only a short part of the belt adjacent to the peak 12 will engage the ground, but if at any time soft ground is encountered the belt will sink somewhat and at the same time a larger area of the belt becomes engaged, affording ample traction and supporting surface. When considerable heavy pulling is to be done, or when the machine is to be run in soft ground for a considerable time, or for any other reasons, the front end of the tractor, in the direction of motion, may be elevated, as shown in Fig. 2, by proper manipulation of the lever and pawl to bring the pawl into one of the end notches 18. One of the straight, normally inclined parts of the ground stretch of the belt, the part from the peak 12 to the rear end of the ground stretch, is now brought flat upon the ground, while the forward part of the ground stretch is inclined upwardly about twice as much as in Fig. 1. This forward inclined part of the belt will perform, as previously stated, the function of easily riding over stones and other obstructions, while the long engagement with the ground afforded by the rear part of the ground stretch gives ample traction and support. In an evident manner, the rear end of the tractor may be tilted up for running backward.

When desired, the tractor may be made free by throwing latch 22 over grip piece 21, thus holding pawl 20 out of notches 18, 19. In this case, the driving reaction will cause the tractor to tilt up at its forward end in the direction of driving. For instance, in Fig. 2, when traveling in the direction of the arrow, the driving reaction will automatically tilt the tractor into the position shown. When the tractor is in the position of Fig. 1, turning of the machine is greatly facilitated by the easy pivoting of the driving tractors about their peaks 12.

I claim:—

1. In a traction machine, the combination of a main frame, a tractor belt supporting structure pivoted to the main frame at a point intermediate its ends, the tractor belt being provided with a bulge on its ground face intermediate its ends, means for tilting the belt supporting structure upon its pivot, and means for locking the belt supporting structure in position.

2. In a traction machine, the combination of a main frame, a drive axle thereon, tractor frame side members pivoted upon the axle and extending forward and backward therefrom, a belt drive sprocket carried at one end of said members, a belt idler sprocket carried at the opposite end of said members, a continuous tractor belt passing about the sprockets, a track on the lower edges of said side members engaging the ground stretch of the belt, said track being provided with a bulge between the ends of said ground stretch and means for securing the tractor frame side members in adjusted position in relation to the main frame.

3. In a traction machine, the combination of a main frame, a drive axle thereon, tractor frame side members pivoted upon the axle and extending forward and backward therefrom, a belt drive sprocket carried at one end of said members, a belt idler sprocket carried at the opposite end of said members, a continuous tractor belt passing about the sprockets, a track on the lower edges of said side members engaging the ground stretch of the belt, said track being provided with a peak between the ends of said ground stretch and a straight reach from the peak to each end of said stretch and means for securing the tractor frame side members in adjusted position in relation to the main frame.

4. In a traction machine, the combination of a main frame, a drive axle thereon, a tractor pivoted about the axle, said tractor including a frame, a continuous tractor belt passing about the frame, and means by which the ground stretch of said belt is positively supported in the form of a wide angled V, means for securing the tractor in adjusted position in relation to the main frame.

5. In a traction machine, the combination of a main frame, a tractor frame having belt pulleys at opposite ends thereof, a belt passing about the pulleys, means for supporting the belt intermediate the pulleys and for maintaining a bulge in the ground stretch of the belt, a pivotal connection between the tractor frame and the main frame at a point between said pulleys, a drive pulley on one of the belt pulleys, a drive pulley mounted on said pivotal axis, a flexible driving band passing around said driving pulleys to drive the tractor belt, and means for tilting the tractor frame and holding it in different positions in relation to the main frame.

WILLIAM STRAIT.

Witnesses:
D. M. SMITH,
A. M. PARKINS.